COMPONENT PLACEMENT APPARATUS

Filed Oct. 26, 1955 7 Sheets-Sheet 1

INVENTORS:
GEORGE HERMAN SITTNER,
EARL WEBER SIEGEL,
BY George Billgroth
THEIR ATTORNEY.

COMPONENT PLACEMENT APPARATUS

Filed Oct. 26, 1955 7 Sheets-Sheet 2

INVENTORS:
GEORGE HERMAN SITTNER,
EARL WEBER SIEGEL,
BY
THEIR ATTORNEY.

April 8, 1958 G. H. SITTNER ET AL 2,829,371

COMPONENT PLACEMENT APPARATUS

Filed Oct. 26, 1955 7 Sheets-Sheet 3

INVENTORS:
GEORGE HERMAN SITTNER,
EARL WEBER SIEGEL,

BY George R. Ogloth [signature]
THEIR ATTORNEY.

COMPONENT PLACEMENT APPARATUS

Filed Oct. 26, 1955 7 Sheets-Sheet 4

INVENTORS:
GEORGE HERMAN SITTNER,
EARL WEBER SIEGEL,
BY George [signature]
THEIR ATTORNEY.

INVENTORS:
GEORGE HERMAN SITTNER,
EARL WEBER SIEGEL,
BY George R. Eltzroth
THEIR ATTORNEY.

COMPONENT PLACEMENT APPARATUS

Filed Oct. 26, 1955

INVENTORS:
GEORGE HERMAN SITTNER,
EARL WEBER SIEGEL,

BY [signature]

THEIR ATTORNEY.

COMPONENT PLACEMENT APPARATUS

Filed Oct. 26, 1955 7 Sheets-Sheet 7

INVENTORS:
GEORGE HERMAN SITTNER,
EARL WEBER SIEGEL,
BY George V. Eltgroth
THEIR ATTORNEY.

United States Patent Office 2,829,371

Patented Apr. 8, 1958

2,829,371

COMPONENT PLACEMENT APPARATUS

George Herman Sittner, Schenectady, and Earl Weber Siegel, Ithaca, N. Y., assignors to General Electric Company, a corporation of New York Application October 26, 1955, Serial No. 542,885

15 Claims. (Cl. 1—91)

The present invention relates to the art of assembling electrical components into circuit matrices and has as an object thereof to provide a novel component placement apparatus.

The novel component placement apparatus, which is the subject of the present invention, is intended for use in an automatic assembly system wherein not only the assembly operations are carried out without manual intervention, but wherein the changeover from one product to another is accomplished without direct manual intervention.

In the placement operation, the subject apparatus is arranged to accept properly sorted components and appropriate circuit matrices, and then to place the components in preassigned positions in the circuit matrices. The positioning of the components in the placement operation is accomplished remotely from data such as may be obtained from punched cards.

In changing from one type of product to another, direct manual intervention is unnecessary. Changeover merely requires that a new set of data be supplied to the data center for the apparatus, and that a new assortment of components and new circuit matrices be supplied.

The apparatus embodying the present invention finds particular application to low and moderate quantity production runs. In such use, it is contemplated that lots as small as 10 or 20 may be economically assembled. While unitary productions may be assembled best by hand, and high production runs may not require such highly flexible equipment, the present apparatus is adapted to fill the gap between the two modes of assembly at moderate and low production quantities. In certain applications in which mechanization is employed, the present invention possesses marked advantages even at moderate production levels. These applications are those in which changeover is long and tedious or in which precise component positioning is required.

The apparatus herein described is designed to place electrical components with wire lead terminals into circuit matrices. In accordance with current practice many kinds of components are available with wire lead terminals. In many cases, these leads serve both to provide electrical energization to the component and mechanical support to the component. Resistors, capacitors, and inductors have long been available in this form. Currently transistors and vacuum tubes are also becoming available in this form. The growing availability of leaded components of all kinds makes it possible for a single machine adapted to handle leaded components to perform nearly all the assembly operations in many kinds of wired electrical equipment.

Accordingly, it is an object of the present invention to provide a novel component assembly apparatus adapted to place leaded components into circuit matrices.

It is a further object of the present invention to provide a novel component placement apparatus adapted to be readily converted from assembling one type of finished circuit board to another.

It is still another object of the present invention to provide a novel component placement apparatus adapted to be remotely controlled as by punch cards.

It is another object of the present invention to provide a novel placement apparatus adapted to place components accurately in any of a large number of positions and orientations.

It is an object of the present invention to provide a novel placement apparatus adapted to place leaded components of many configurations into circuit matrices.

These and other objects are achieved in accordance with the present invention in a placement apparatus adapted to accept components individually placed in universal component carriers, whereby components of many varieties may be accepted without modification of the placement apparatus. The placement apparatus is further provided with means for translating the component carrier to a position at which the leads of the component carrier have entered the desired orifices within the circuit matrix, the true position of the leads being referenced to the surfaces of the component carrier by which it is held in the placement apparatus, after which a stabilizing member holds the component in place while the component carrier is being separated from the component, and preferably delivers an additional downward thrust to the component so that the leads of the component extend beneath the circuit matrix. Further means are provided beneath the circuit board for further lowering of the component and for clipping the leads and bending them aside so as to securely hold the component in place while the circuit board is processed.

In accordance with further aspects of the invention novel means are provided for positioning the component accurately in azimuth, and along two coordinate axes after which a sequence of like placement operations are performed with a minimum of moving mass.

In accordance with another aspect of the present invention a stabilizing element having parallel gripping surfaces constrained to move in parallel planes is employed.

The novel features which are characteristic of the invention are set forth with greater particularity in the appended claims. A more thorough understanding of the invention both as to its organization and method of operation, together with further objects and advantages inhering therein may be had by a consideration of the following text taken in connection with the following figures in which:

Figure 8A:
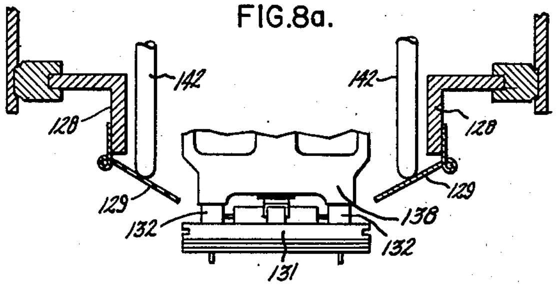
Figure 8B:
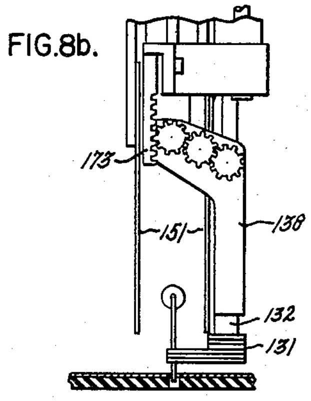
Figure 8C:
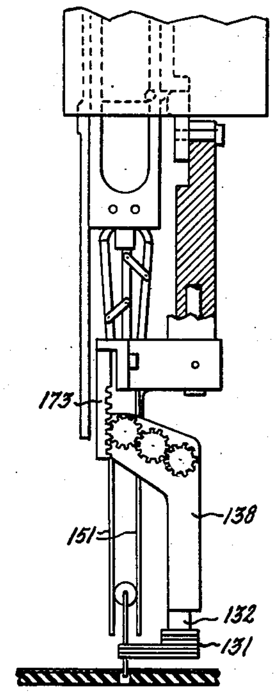
Figure 8D:
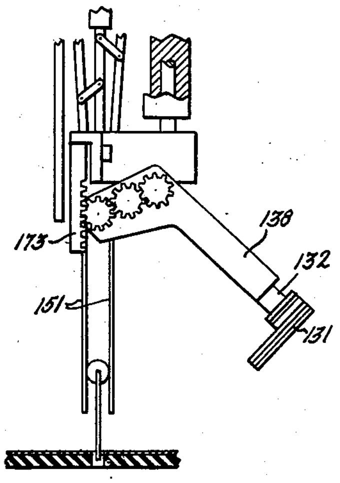
Figure 8E:
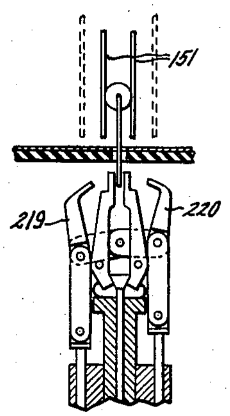
Figure 8F:
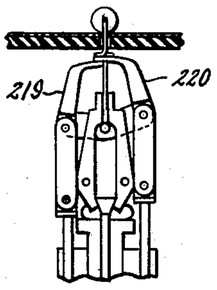
Figure 9:
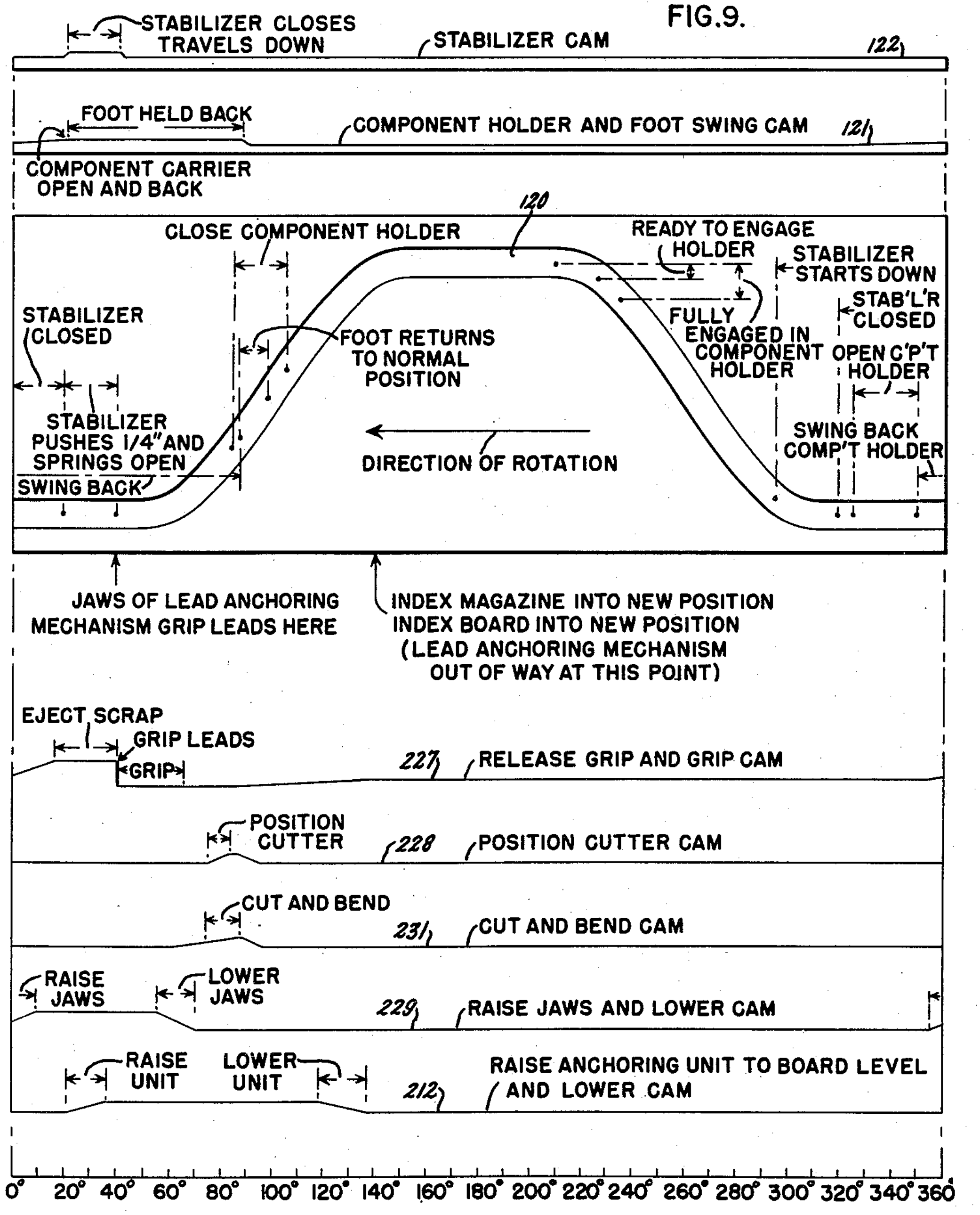

Figures 8*a*, 8*b*, 8*c*, 8*d*, 8*e* and 8*f* illustrate the positions taken by those portions of the placement apparatus more immediately associated with the component during the placement cycle; and Figure 9 is a cam timing diagram illustrating the relative positions of the camming surfaces with respect to an arbitrary rotational abscissa.

Figure 1:
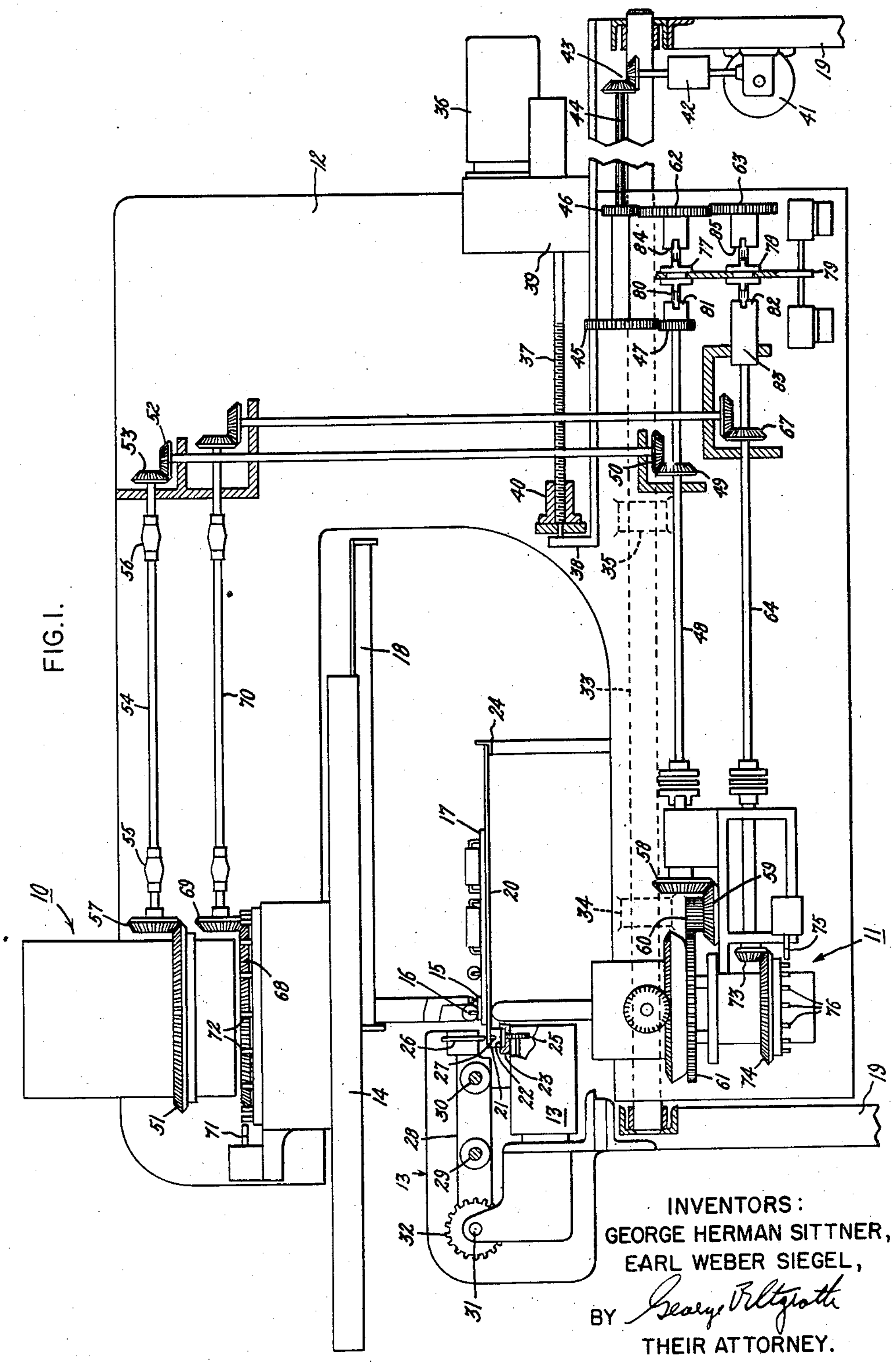
Figure 1 is a simplified side elevation view of the placement apparatus, wherein emphasis is placed on the manner of positioning the placement apparatus and supplying power thereto.

The component placement apparatus is shown in a simplified side elevation view in Figure 1. The major elements of the apparatus are the component placement head 10, and the lead anchoring mechanism 11, the travelling C frame 12 upon which the component placement head 10 and the lead anchoring mechanism 11 are supported, the circuit board transport and positioning mechanism 13, and the component magazine advancing mechanism 14. The illustration also contains a simplified showing of the means by which operating power is supplied to these mechanisms and by which they are positioned in the performance of their individual functions.

Prior to a more detailed discussion of the construction of the principal elements of the placement apparatus, one should consider the functions which these elements perform in a complete component assembly system. The placement apparatus represents the point of convergence of the electrical components with the circuit matrices into which the components are placed. The placement apparatus performs the function of placing and attaching the electrical components in connections provided for them in the circuit matrices. In the present embodiment, the attachment is preliminary to a final soldering in a subsequent portion of the component assembly system.

The placement apparatus in the present system is of a universal design, one machine being capable of placing many varieties of components in each of their respective positions in a circuit board without manual readjustment. Flexibility in respect to varieties of components is provided by means of a universal component carrier which is adapted to provide a common handling method for many kinds of leaded components. Such a component carrier is shown at 15 supporting a component 16. This universal component carrier is disclosed and claimed in co-pending application Serial No. 495,638 filed on March 21, 1955 on behalf of F. M. Rives, et al. Flexibility in respect to positioning is achieved by use of a novel placement apparatus which can be made to assume a large number of closely spaced intervals in three degrees of freedom in response to properly coded electrical control signals.

In order to maximize the efficiency of this "universal station" type of assembly, the placement apparatus is programmed to perform a predetermined number of essentially identical operations at each position of the placement apparatus. In executing this plan, the circuit boards, one of which is shown at 17, are fed into a closed conveyer system (a portion of which is shown in the earlier mentioned transport and positioning mechanism 13) in batches of predetermined number (typically 20). Likewise, the components are admitted to the placement apparatus in magazines containing like components in equal numbered batches. A representative magazine is shown at 18. During a complete cycle of operation of the placement apparatus in this assembly system, a batch of circuit boards is admitted to the closed circuit board conveyer associated with the placement apparatus, and a first magazine containing a batch of desired components is supplied to the placement head from the magazine advancing mechanism 14. The placement apparatus is then positioned with respect to the first circuit board for placing the first component. Then each of the circuit boards is circulated in rapid succession through the placement apparatus while successive like components are advanced in the magazine advancing mechanism 14 into placement head loading position. The placement head then affixes them to the circuit boards. After the first magazine has been emptied by discharging one component to each circuit board, the first magazine is discharged from the placement apparatus and successively, additional magazines each containing a batch of like components are admitted to the placement apparatus. Each time a new magazine is admitted, the circuit boards are circulated once through the placement apparatus in proper position to receive each new component. When all the different components have been placed, the closed circuit board conveyer system is opened, and the circuit boards are sent off for further handling. At this time a new set of circuit boards may be admitted to the system, and the cycle repeated.

The placement apparatus in the performance of its placement function is adapted to place components in any of a large number of closely spaced intervals along three degrees of freedom and to perform the placement with a high degree of accuracy. These degrees of freedom are along each of two mutually perpendicular coordinate axes divided into intervals of 0.001 inch with a tolerance range of 0.005 inch and along an azimuth, in which the intervals are 22½ degrees with an accuracy within the same linear tolerance as specified along the coordinate axes. Location of the placement apparatus along one axis is achieved by means of the circuit board transport and positioning mechanism 13. Location along the other axis is achieved by motion of the C frame 12 relative to the mechanism 13 and the fixed frame 19 of the placement apparatus. Positioning in azimuth is achieved by simultaneous rotation of the placement head 10 and the lead anchoring mechanism 11 with respect to the C frame 12.

Having now generally outlined the overall functions of the placement apparatus, we may now consider in greater detail the manner in which these functions are achieved. A portion of the circuit board conveyer is shown at 13. The conveyer performs the function of transporting the circuit board shown at 17 in a direction transverse to the plane of representation of Figure 1. For convenience in further discussion, this direction may be assumed to be toward the viewer and may be designated the $x$-coordinate. The circuit board 17 is mounted in a carrier mechanism or pallet 20. The pallet 20 is a flat frame-like structure having at one end a thickened portion 21 which has on its under surface a rack gear 22. The pallet is adapted to be transported in the $x$-direction along the tracks 23 and 24 of the conveyer system by means of a group of driven gears 25 adapted to mesh with the rack gear 22 on the under surface of 21.

The circuit board transport and positioning mechanism 13 includes means for precisely locating the circuit board along the $x$-coordinate. This is achieved by means of an accurately positioned solenoid operated taper pin 26, which may be forced into engagement with a conical recess 27 provided in the member 21 of the pallet 20. The taper pin 26 is supported upon a sliding carrier 28, adapted to slide along a track formed by two parallel rods 29 and 30, supported on the fixed frame 19. Accurate positioning of the taper pin is achieved by means of a worm gear drive whose shaft 31 rotates in bearings fixed to the frame 19. The worm engages a screw nut on the carrier 28 and translates it along the axis of the worm. Power for translation of the carrier 28 is supplied by an electrical servo-motor (not shown) which rotates the gear 32 fixed to the shaft 31. The position of the servo-motor is electrically controlled from properly coded punch cards.

The circuit board transport and positioning mechanism functions in the following manner. The pinion gears 25 are continuously driven through a slipping clutch by an electric drive. They engage the under surface of the pallet meshing with the rack gear 22, thereby translating the pallet 20 and the circuit board 17 contained thereon along the tracks 23 and 24. When the pallet has brought the circuit board approximately into position, a micro-switch (not shown) is operated by the pallet to close the energizing circuit of the solenoid driven taper pin 26. The taper pin is then forced into the recess 27 of the pallet. Slipping clutches (not shown) between the pinion gears 25 and the motor drive permit the pallet to remain fixed in position under the placement head during the interval required to place a component upon the circuit board.

Positioning of the placement head and the lead anchoring mechanism with respect to a direction transverse to the conveyer, i. e., the Y coordinate, is achieved by motion of the C frame 12 with respect to the fixed frame 19. The C frame travels on a track formed by a pair of cylindrical rails 33 passing through bearings 34 and 35 in a direction transverse to the path of conveyer 13. Precise positioning of the placement head and lead anchoring mechanism is achieved through use of an electrical servo motor 36 which operates the lead screw 37 through an appropriate gear reducing mechanism is accordance with a second set of properly coded electrical signals. The lead screw 37 turns in bearings 38 and 39 supported upon the stationary frame 19, and engages internally threaded nut 40 affixed to the C frame 12 to cause translation thereof.

The elements bearing reference numerals lying between 41 and 85 perform the functions of positioning the placement head 10 and the lead anchoring mechanism 11 in azimuth and of supplying power for the operation of these mechanisms in the component placement operation. The variable speed reversible motor 41 mounted upon the frame 19 supplies the power for these last-mentioned purposes through a gear reduction unit which is coupled through a clutch and brake mechanism 42, a right angle drive 43 and the splined shaft 44 upon one portion of which the gears 45 and 46 respectively are supported. The other portion of the splined shaft 44 is supported upon the fixed frame 19, while the portion upon which the gears 45 and 46 are mounted, is supported upon the traveling C frame 12. In this way, power is transmitted to the gears 45 and 46 in all positions of the C frame 12.

The gear 45 serves as the first unit in the gear train for operation of the placement head 10 and the lead anchoring mechanism 11. The gear 45 is arranged to mesh with a second gear 47, which latter gear is supported for free rotation upon a shaft 48 and selectively engagable by a tongue and slot clutch. The shaft 48 is arranged to rotate in bearings fixed upon the C frame 12 and is provided at one end and at an intermediate point with a bevel gear. The bevel gear 49, which is at an intermediate point along the shaft 48, is arranged to mesh with a bevel gear 50, which is the first gear in a mechanical linkage which ultimately connects the shaft 48 with the bevel gear 51 surrounding the cylindrical portion of the placement head 10. The mechanical linkage comprises the bevel gears 49 and 50, which furnish an initial right angle drive, bevel gears 52 and 53 which furnish a second right angle drive, a shaft 54 having at either end universal joints 55 and 56, and a final bevel gear 57 which engages the bevel ring gear 51. The universal joints 55 and 56 permit slight raising and lowering of the placement head 10 within the C frame 12 without difficulty from misalignment of the driving mechanisms. As will subsequently be explained, bevel ring gear 51 serves to operate the component placement mechanisms shown extending the component 16 toward the circuit board 17.

Operation of the lead anchoring mechanism 11 occurs through a second linkage driven from the gears 45 and 47, and the shaft 48. The bevel gear 58 is attached to the left end of the shaft 48 in the showing of Figure 1. This engages a second bevel gear 59 which is formed integrally with a pinion gear 60 engaging a ring gear 61 which encircles the lead anchoring mechanism 11. The ring gear 61 transmits power to the lead anchoring mechanism 11 for the purpose of operating it.

Since both the bevel ring gear 51 which operates the component placement mechanisms in the placement head 10 and the ring gear 61 which operates the lead anchoring mechanism are driven through a sequence of positive acting mechanical linkages driven from a common gear 45, their operation is synchronised.

The gear 46 on the splined shaft 44 serves as the azimuthal drive take off for the placement head 10 and anchoring mechanism 11. As will be explained later, it also is linked to the operating gears 51 and 61, but for the sole purpose of keeping these gears in the same position, independently of azimuthal position, relative to the operating mechanisms. The gear 46 engages a gear 62 which is adapted to rotate freely upon the shaft 48 except when locked thereto by the tongue and slot clutch 84. The gear 62 also engages a gear 63 which is adapted to rotate freely upon a shaft 64 except when locked thereto by clutch 85. The shaft 64 is supported for rotation in bearings fixed to the C frame 12. At a point intermediate between the ends of the shaft 64 a bevel gear 67 is provided, adapted to drive through an intermediate mechanical linkage a bevel ring gear 68 supported upon the rotating portion of the placement head 10. This linkage includes a pair of right angle drives, one of which involves the bevel gear 67, and terminates with a bevel gear 69 driven through a shaft 70 having a pair of universal joints to permit limited motion of the placement head 10 with respect to the C frame 12. The bevel ring gear 68 transmits rotary motion to the placement head 10 to rotate the head to the desired azimuth.

Accuracy in rotation of the placement head 10 is provided by means of a solenoid operated Y-member 71 engaging one of the precisely located indexing pins 72. The indexing pins 72 are supported upon the rotating portion of the placement head 10.

Rotation of the lead anchoring mechanism 11 is achieved through a mechanical linkage including shaft 64, bevel gear 73 and ring gear 74. As shown in Figure 1, the bevel gear 73 is secured to the left end of shaft 64. This gear engages the bevel ring gear 74 supported upon the rotating portion of the lead anchoring mechanism 11. The bevel ring gear 74 serves to rotate the lead anchoring mechanism 11.

Accurate rotational positioning of the lead anchoring mechanism is achieved by means of a solenoid operated Y member 75 adapted to engage the appropriate one of a plurality of indexing pins 76 spaced at equal intervals about the periphery of the barrel of the lead anchoring mechanism 11.

It may be observed that azimuthal positioning of the placement head 10 and of the lead anchoring mechanism 11 is mechanically inter-connected to provide nearly perfect orientation of the two. Whatever play may exist in the mechanical gear trains just recited is completely removed by use of the pins and solenoid operated Y members which are provided for both the placement head 10 and the lead anchoring mechanism 11.

Controlled selection of either operation of the placement head and lead anchoring mechanism or azimuthal control of these members is effected by means of a clutching mechanism, which comprises a pair of ganged two faced clutches 77 and 78 adapted to be moved in unison from force supplied by a solenoid operated clutch actuator 79. The clutch 77 is splined to the shaft 48, being adapted to slide along the axis of the shaft 48 while engaged with mating splined surfaces 80 provided on the shaft 48. Likewise, the clutching member 78 is splined to the shaft 64 in a manner providing axial motion of the clutch along the shaft 64. The clutch faces of both 77 and 78 are provided with positive engaging dogs or tongues. The clutch 77 is adapted to engage at the left limit of its travel a mating slot 81 formed integrally with the gear 47, while at the same time the clutch 78, also at the left limit of its travel, engages a mating slot 82 formed integrally with the stationary bearing 83. In the left position, the clutch 77 engages the shaft 48 with the gear 47 and thus powers the head and lead anchoring mechanism operating ring gears 51 and 61 from the gear 45. The clutch 78 at the same time locks the shaft 64 to the stationary bearing 83 thus preventing any change in azimuth of either the placement head 10 or the lead anchoring mechanism 11.

Azimuthal rotation occurs when the ganged clutches 77 and 78 are operated to the right hand position. The gear 62, normally free running on the shaft 48 is provided with a clutch engaging slot 84 formed integrally with the gear. Likewise the gear 63, normally free running on the shaft 64 is provided with a similar clutch engaging slot 85. When the clutches 77 and 78 are set in the right hand position, their right hand clutch faces engage respectively the slots 84 and 85, thereby engaging the gear 62 with the shaft 48 and the gear 63 with the shaft 64 respectively. Since the shaft 48 is linked to both the operating bevel ring gear 51 and ring gear 61 and the shaft 64 is linked to the azimuthal gears 68 and 74, any change in azimuth causes an equal absolute rotation of the operating gears, and prevents relative motion of the operating gears with respect to their mechanisms such as would cause operation.

The clutch and brake 42 is adapted to lock the shaft 44 during periods that the placement apparatus is quiescent, i. e., when no adjustment in azimuth or motion of the operating mechanisms is occurring. The locking occurs at the moment that the clutch is disengaged.

Figure 2:
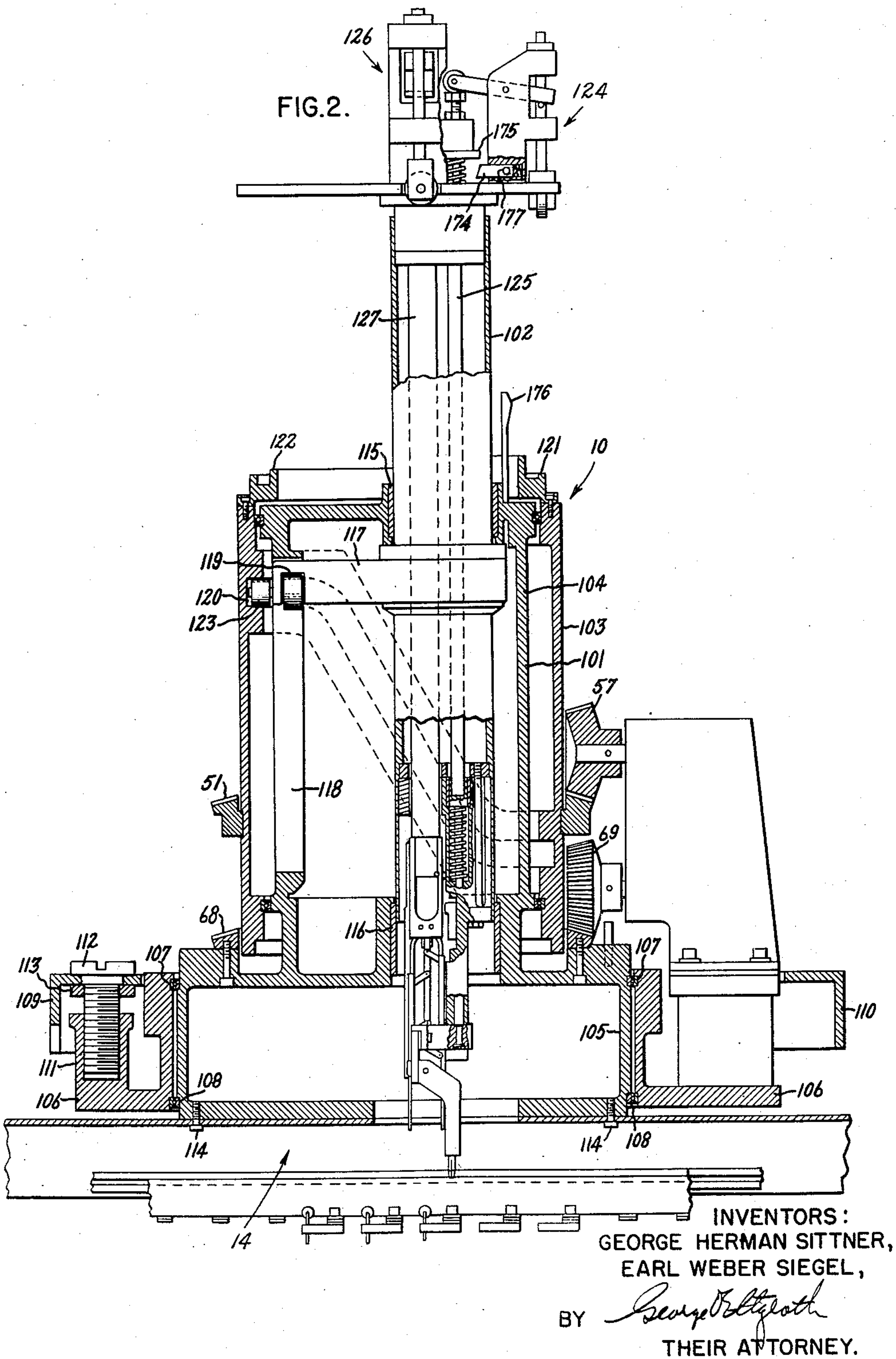
Figure 2 is a modified section of the placement head indicating in general the principal parts and the cams by which they are operated.

Figure 2 illustrates the construction of the placement head 10, its mode of support within the C frame 12, and the manner in which the component magazine advancing mechanism 14 is supported upon the placement head 10. The placement head is formed of three principal elements: a placement head frame 101, a cylindrical operating column 102, and a camming cylinder 103. The placement head frame 101 is formed of two generally cylindrical portions, an elongated upper portion 104 having a relatively small diameter and a short lower portion 105 having a relatively large diameter. The lower cylindrical portion 105 is mounted on a generally cylindrical opening in a cradle 106, upon bearings 107 and 108 which permit rotation of the frame 101 within the cradle 106. The azimuthal bevel gear 68 is attached to the upper surface of 105, and imparts rotational motion to the placement head 10 when the mating gear 69 is rotated. The cradle 106 is supported upon angles 109 and 110, which are affixed to the C frame 12, by means of an adjustable three point support. The details of one of these adjustable supports, employing internally threaded stud 111, screw 112, and collar 113, is illustrated at the lower left hand portion of Figure 2. The upwardly extending stud 111, having a threaded inner surface is provided on the cradle 106. The screw 112, passes through the angle member 109 and is adapted to turn freely therein with its threaded portion engaging the stud 111. Axial motion of the screw 112 with respect to the angle 110 is prevented by the collar 113 so that the entire placement head mechanism may be positively elevated or depressed when the screw 112 is rotated in the threaded recess 111 of the cradle member 106. As will subsequently be explained, this adjustment permits operation of the placement apparatus with circuit boards of varying thicknesses. The magazine advancing mechanism is shown at 14. It is supported upon the lower surface of the placement head frame 101 by means of the screw members 114. Upon rotation of the placement head mechanism, the magazine advancing mechanism and the magazine contained in it are rotated together.

Having now generally described the manner in which the placement head is supported within the C frame and the manner in which the magazine advancing mechanism is supported upon the component placement head, we may now return to a discussion of the construction of the placement head per se. At the upper and lower ends of the region 104 of the placement head frame 101, there are provided cylindrical bearings 115 and 116 respectively for permitting free axial movement of the cylindrical operating column 102 with respect to the placement head frame 101. Rotation of the cylindrical operating column 102 in the frame 101 is prevented by keying an extension 117 affixed to the cylinder 102 into a straight slot 118. The slot 118, formed in the upper portion 104 of the frame member 101, is oriented parallel to the axis of the frame 101. The walls of 104 are thickened along the edges of the slot. In order to reduce the friction within the slot, when the extension 117 is moved in it, a roller 119 is provided on the extension 117 at the point of engagement with the slot 118.

Operation of the cylindrical operating column 102 is effected by means of three cams 120, 121, and 122 on the camming cylinder 103. The cam 120 is employed to raise and lower the cylindrical operating column 102; the cam 121 supported on the upper portion of the camming cylinder 103 is employed to release a component from the component carrier; and the cam 122 is used in operation of the component stabilizer during placement.

The cam 120, which raises and lowers the operating column 102 is defined by two parallel ridges formed on the inner wall of the camming cylinder 103. These ridges extend obliquely from the upper end of the camming cylinder 103 to its lower end, where there is an appreciable horizontal portion and then the return to the upper end of the camming cylinder, where there is also an appreciable horizontal portion. The ridges are arranged to guide a second roller 123 attached to the outermost extremity of the extension arm 117. Raising and lowering of the cylindrical operating column is effected by rotation of the camming cylinder 103, which causes the cam 120 to exert a force on the roller 123 generally perpendicular to the direction of the cam. The key slot 118 in which the roller 119 runs, however, prevents the extension arm 117 and the operating column 102 from rotating and so responds solely to the component of the force axially displacing the operating column 102. The driving force for axial motion of the operating column is supplied by the bevel gear 57 which engages the bevel ring gear 51 attached to outer surface of the camming cylinder 103.

The upper portion of the cylindrical operating column 102 supports the followers for the component releasing cam 121 and for the component stabilizing cam 122. These followers actuate rods extending axially through the operating column 102. The component releasing cam 121 engages the cam follower 124 which effects downward motion of the upwardly biased operating rod 125 connected to component releasing members to be subsequently described. The cam follower 126 engages the inner cylindrical cam surface 122 and causes axial motion of the shaft 127 attached to the component stabilizing member, also to be described in greater detail hereafter.

Figure 5:
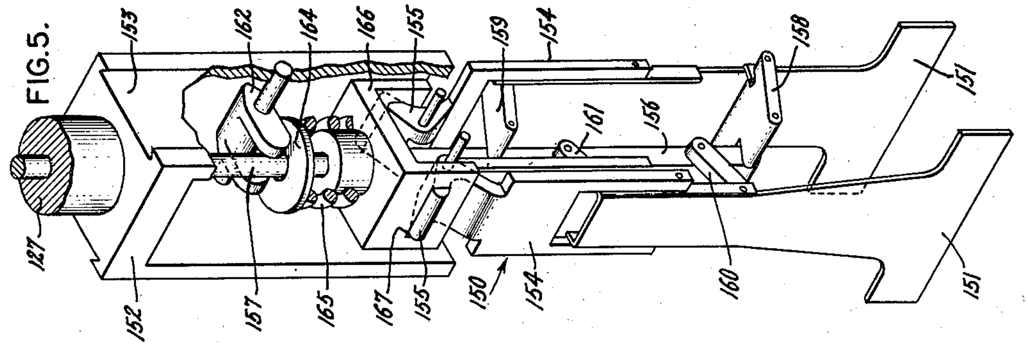
Figure 5 is a perspective view of the component stabilizer of the placement head.

Rotation of the camming cylinder 103 effects a change in the positioning of the cams 120, 121 and 122 as indicated in the cam diagrams of Figure 9 thereby causing synchronized operation of the elevating mechanism, the component releasing mechanism, and the component stabilizing mechanism. In order that the operation of these elements be more completely understood, reference is made to Figures 3, 4 and 5. These figures present a detailed view of the component handling portions of the component placement head, Figure 3 being a view taken at right angles to the view of Figure 1, Figure 4 being a view taken in the same plane as Figure 1, and Figure 5 being a detailed view of the construction of the component stabilizing element of the component mechanism.

The functioning of the placement apparatus can best be understood after one considers the manner in which components are supplied to the placement apparatus. As indicated, previously, the components are handled in groups in magazines which are adapted to accommodate many kinds of components by means of a universal component carrier into which each component is fitted before it is loaded into the carrier. Each magazine contains components of the same kind, while the nature of the component may vary from magazine to magazine.

Figure 3:
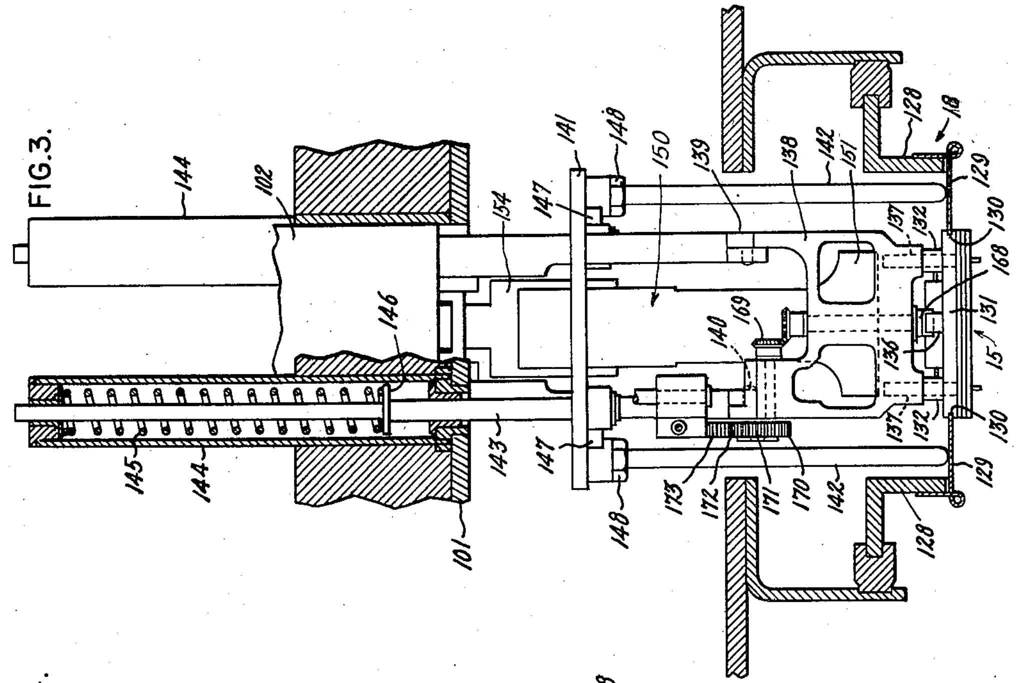
Figure 3 is a front elevation view of the carrier receiving member and the component stabilizer of the component placement head.

A cross section of the component magazine is shown at the lower portion of Figure 3. The magazine is of elongated construction having a frame formed of a pair of parallelly aligned channels 128. The channels 128 each support a row of twenty hinged component carrier gripping fingers 129. These fingers extend inwardly from their hinges toward the center of the magazine where they fit into slots 130 provided in the lateral surfaces of each component carrier 15. The fingers are upwardly biased into engagement with a stop preventing further upward rotation, thus normally supporting the component carrier 15 in the horizontal position illustrated in Figure 3. Upon downward rotation, the ends of the fingers 129 are withdrawn from the slots 130 to permit either unloading of the component carrier from the magazine or loading of the carrier into the magazine.

Figure 4:
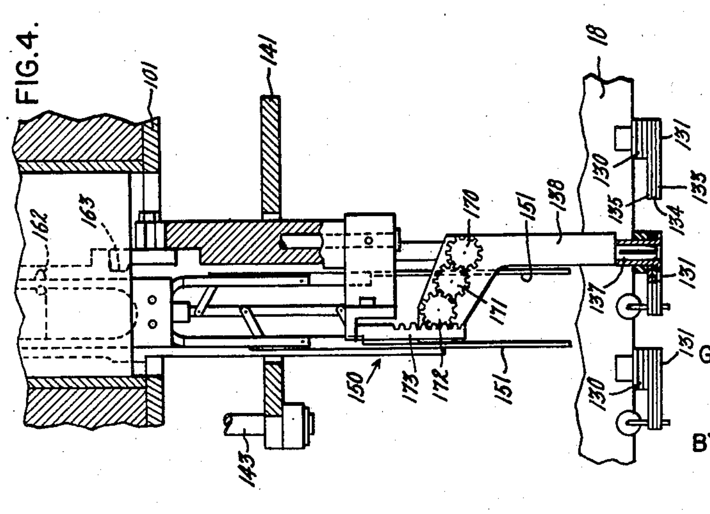
Figure 4 is a side elevation view of the same parts of the placement head.

The construction of the universal component carrier may also be observed by reference to Figures 3 and 4. The component carrier has a principal frame member 131 which is an elongated rectangular parallelopiped, having the supporting slots 130 on opposite ends of the major axis. Cylindrical collets 132 adapted to frictionally engage suitable cylindrical prongs are attached to the frame 131 for translating the component carrier. Components are supported in the component carrier by means of three serrated plates 133, 134, 135, which co-operate to form a plurality of regularly spaced component lead gripping jaws. Opening and closing of the jaws is accomplished by sliding the two outer serrated plates 133 and 135 along the line of the serrations in a direction opposite to a similar motion imparted to the center plate 134. A slotted carrier actuator 136 mounted upon the frame 131 drives a camming mechanism (not shown) for opening and closing the lead gripping serrations for loading and unloading the carrier. The large selection of jaw spacings permits components of many shapes and sizes to be handled by the component carrier, and the joint provision of the supporting slots 130 and the transfer collets 132 permit free transfer of the component carrier to and from the magazine.

The placement head operating column 102 is provided with means for seizing a loaded component carrier and removing it from the magazine, and then after unloading the carrier, of returning the unloaded component carrier to the magazine. The means for performing the loading and unloading operation are the elements bearing reference numerals 137 to 148.

The component carrier 15 has just been seized by the component placement head and is just about to be removed from the magazine 18 in the position illustrated in Figures 4 and 3. Resilient prongs 137 extending downwardly from the pivoted carrier receiving member 138 of the placement head are shown engaged with the collets 132 of the component carrier. The carrier receiving member 138 forms the lowermost extremity of the placement head operating column 102. The carrier receiving member 138 is generally of an inverted L or J shape, being pivoted to rotate about a horizontal axis at the extremity of the short offset portion in bearings 139 and 140 upon the operating column 102. The carrier receiving prongs 137 extend downwardly from the main or trunk portion of the receiving member 138.

While the component receiving prongs 137 are coming into engagement with the collets 132 of the component carrier, the magazine transfer release begins to function. The magazine transfer release comprises an intermediate plate 141 encircling the operating column 102, and a pair of magazine finger depressing rods 142 depending from the plate 141. The magazine transfer release is supported by a pair of rods 143 extending upwardly from the plate 141, which rods are journalled to a pair of cylindrical members 144 mounted upon the lower wall of the placement head frame 101. A biasing spring 145 acting against a flange 146 formed integrally with each rod 143 is provided inside the cylinders 144 for biasing the magazine transfer release downward. The downward motion is controlled by a pair of outwardly extending pins 147 affixed to the operating column 102 and adapted to engage the under surface of the intermediate plate 141. Accordingly, when the operating column 102 is lowered, the restraining pins 147 permit the magazine transfer release rods 142 to be lowered into engagement with the carrier supporting fingers 129. (The initial contact position is illustrated in Figure 3.) As the operating column 102 continues its downward motion, from the position illustrated in Figure 3, the magazine finger depressing rods 142 continue their downward motion until the fingers 129 permit release of the component carrier and permit the passage of the other mechanisms at the end of the operating column through the magazine. The flange 146 stops the downward motion of the magazine transfer release when the operating fingers 129 have reached this latter position while the operating column 102 continues. After the component carrier has been unloaded, the operating column then returns in an upward path, the magazine finger depressing rods 142 effecting a simultaneous closure of the carrier supporting fingers 129 so as to cause reengagement of the fingers with the slots 130 in the component carrier. Once the fingers of the magazine have finally reached the horizontal position beyond which they can not rotate, they strip the component carrier from the prongs 137. The operating column 102 continues its upward path until the upper surface of the intermediate plate 141 is in close proximity to the under surfaces of the placement head frame 101 thus creating space beneath the placement members for advancing another loaded component carrier into loading position.

The operation of loading the component placement head with a loaded component carrier, stripping the loaded component carrier from the magazine, and then later returning the unloaded component carrier to the magazine, and stripping it from the component placement head requires that the magazine finger depressing rods 142 act in close synchronism with the operating column 102. Since the two move together during the magazine loading and unloading operation, the only adjustment which is necessary to insure synchronism is that of the downward extension of the rods 142 with respect to the surfaces upon which the component carrier is engaged. Adjustment of the extension of the rods 142 is provided by threading the upper ends of the rods into the plate 141 and providing lock nuts 148 for retaining the rods in any adjusted position. It is also necessary, in order that the component carrier be properly seated upon the prongs 137 that the biasing springs operating the magazine fingers 129 exert a substantially greater force than the frictional force normally required to thrust the prongs 137 into the collets 132 upon the component carrier. Alternatively, the prongs 137 may be dimensioned to fit loosely into the collets 132, and magnets may be provided on the under surface of the member 138, for holding the component carrier in engagement therewith. This likewise provides positive seating of the component carrier.

The mechanisms shown in detail in Figures 3, 4, 5 and 8*a*, 8*b*, 8*c*, 8*d*, 8*e*, 8*f*, perform the function of placing a component carrier in an awaiting circuit board, and of temporarily fastening the component in place until it can finally be soldered. As previously explained, the component receiving member 138 strips a loaded component carrier from the magazine, as shown in Figure 8*a*. The component receiving member 138 continues its downward motion until the lower surface of the component carrier is in sufficiently close proximity with the upper surface of the circuit board for the leads of the components supported in the component carrier to extend an appreciable distance into the circuit board aperture as shown in Figure 8*b*. During the last portion of the downward stroke of the operating column 102 the component stabilizer 150 (illustrated in perspective in Figure 5 and shown in front and side elevations in Figures 3 and 4) is lowered down around the component. Then it is closed about the component so as to support it in position on the circuit board while the component is being released from the component carrier and while the component receiving member 138 is being swung out from under the component. When the carrier has been moved aside, the component stabilizing member 150 performs its final function of lowering the component a short distance, typically one quarter of an inch, down into the circuit board thus permitting the components to be seized by the lead anchoring mechanism and bent in place, as will subsequently be described.

The component stabilizer 150 is supported within the placement head operating column 102, and is attached to the cylindrical rod 127 which is journalled for free axial motion within the operating column. The rod 127 is affixed to an elongated stabilizer frame member 152 which is of generally rectangular cross section and whose major axis is parallel to the axis of the operating column. The inner surface of the operating column is provided with a pair of tongues which are dovetailed into a pair of grooves 153 on the lateral surfaces of the frame member 152 so as to permit axial motion of the component stabilizer within the column 102.

The stabilizer plates 151 form the surfaces which grip the components during the later portion of the placement operation. The members 151 are generally flat, except for a small outward curvature along the bottom edge and are each of an inverted T configuration which permits a relatively long line of contact to be made with tubular members whether they be of the sort that are placed with their axes in a horizontal or in a vertical plane.

The stabilizer plates 151 can be opened or closed to accommodate components of many sizes. The plates 151 are each hinged to the lower extremity of the stabilizer opening and closing lever 154. The axis of the hinge passes through the upper portion of the plates 151 and is in a direction to permit rotation of the plates toward or away from one another. The levers 154 are in turn supported upon the lower portion of the frame 152 in bearings permitting free rotation on an axis parallel to the hinge. The levers 154 are each provided with a short outwardly offset portion 155 adjacent the pivoting point of the lever which upon a downward thrust causes inward rotation of the lower extremity of the lever 154, and closure of the stabilizer plates 151.

The plates 151 are constrained to move in parallel by virtue of their connection with a central member 156 through a parallelogram-like linkage. The central member 156 is a rod-like member aligned coaxially with the center line of the stabilizer having an upper cylindrical portion 157 journalled for free axial motion within the shaft 127. The lower portion of the central member 156 which may be flexibly joined to the upper portion is of rectangular cross section so as to provide a flat bearing surface for the two pairs of parallelogram links coupled with the stabilizer plates 151. These links bear reference numerals 158, 159, 160 and 161.

Closing of the component stabilizer plates 151 is accomplished through a mechanism beginning with the stabilizer toggle 162 which is flipped from closed to open position by a stationary toggle operating projection 163 fixed upon the interior of the operating column 102. The projection 163 is best seen in Figure 4. The toggle 162 is mounted in the stabilizer frame 152 well above the offset ends 155 of the stabilizer operating levers in bearings permitting rotation in a horizontal plane. The outer portion of the toggle thus extends outwardly from the component stabilizer frame 152 to a distance which is insufficient to engage the interior of the operating column except at the projection 163. The interior portion of the toggle 162 includes a cam adapted to depress a washer 164 which encircles the cylindrical portion 157 of central supporting rod upon upward rotation of the outer portion of the toggle. The washer 164 in turn engages on its under surface a spring 165 exerting a downward force upon an inverted U-shaped member 166 also journalled upon the central support at 157. The U-shaped member 166 is provided with a pair of slots 167, one in each leg of the U into which the offset ends 155 of stabilizer operating levers 154 fit. Thus, when the outer extremity of the toggle 162 is flipped up, the inner extremity of the toggle forces the washer 164 down. The washer 164 in turn exerts a downward force upon the spring 165, operating on the U-shaped member 166. The U-shaped member 166 exerts a closing force upon the plates 151. When the outer extremity of the toggle is flipped down, there is a relaxation of closing tension on the stabilizer plates.

During the down stroke, the freely hanging stabilizer plates 151 are spread apart as the outwardly curved lower edges slide over the lateral surfaces of the component to be stabilized. Alternatively, a construction may be employed in which a slight outward bias keeps the plates normally open.

The use of an intermediate spring 165 permits closure of the component gripping surfaces 151 in a non-positive or resilient manner, thus permitting components of various sizes to be held and stabilized.

Having now generally described the interior construction and workings of the component stabilizer 150, we may now consider the features exterior to the stabilizer by which it is operated synchronously with the other elements of the placement head. Reference may also be made to the cam diagram of Figure 9 in this connection. The entire component placement head 10 and the component stabilizer cam 122 which will now be described best are shown in Figure 2. The cam 122 operates the component stabilizer follower 126 which actuates the shaft 127 upon which the component stabilizer 150 is mounted. At the start of the placement cycle, the entire operating column 102 is lowered into place with the stabilizer 150 and its shaft 127 spring biased upwardly to its highest position, relative to the column 102. The cam follower 126 is so positioned with respect to the cam 122 that the first surfaces of contact of the cam 122 provide an initial downward motion of approximately an inch to the component stabilizer with respect to the column 102 during the last portion of the downward motion of the operating column. The cam followers are preferably designed to cause substantial distance multiplication. In the present embodiment, the multiplication is approximately 3 to 1. To achieve the initial descent of the stabilizer relative to the other members on the operating column 102, the ridge of the cam 122 is approximately one third of an inch high.

Closing of the stabilizer plates 151 upon the component and lowering thereof occurs after the operating column has been completely lowered, and the camming surface 120 which controls the height of the operating column is going through its lower flat portion. Seizure of the component by the stabilizer plates 151 is timed to occur just prior to the moment when the component carrier is being separated from the component, so as to prevent the leads of the component from being dragged out of engagement with the circuit board as the carrier is rotated to one side and also to prevent the component from falling to one side.

A small raised portion provided on the cam 122 acting in conjunction with the projection 163 initiates the closure of the stabilizer plates 151 and provides a final approximately quarter inch of downward thrust to the stabilizer plates. At the beginning of the last quarter inch downward thrust of the stabilizer (effected by the raised portion of the cam 122) the toggle 162 encounters the raised portion of the projection 163, forcing the stabilizer plates 151 into closed position about the component. When the last portion of the thrust is reached, the projection is tapered so as to permit the stabilizer plates to release the pressure on the component. At this point, the component leads extend beneath the circuit board a distance sufficient to permit their being gripped by the lead anchoring mechanism 11, which may further lower the component in the circuit board, and which performs the operation of clipping and swaging the components in place. Preferably, shortly after the swaging of the leads, the end of the flat portion of the cam 120 is reached, whereupon the entire operating column 102 is re-elevated, carrying the stabilizer plates 151 upward beyond the placed components. The stabilizer plates hang freely and do not close during elevation of the stabilizer with respect to the operating column 102, since the toggle 162 on passing upwardly by the projection 163 is rotated in a direction opposite to that required to compress the spring 165 and close the stabilizer plates 151.

Further consideration of the detailed construction of the component carrier receiving member 138 will now clarify he manner in which the component is freed from the component carrier so that component may be lowered into position.

The component carrier releasing mechanism is best seen in Figures 3 and 4. It comprises a bevel gear driver 168 which engages the slotted carrier actuator 136. The bevel gear on the driver 168 engages a second bevel gear member 169 affixed to a shaft having its other end a pinion gear 170. The pinion gear 170 is the first of a sequence of three such pinion gears, 170, 171 and 172, the last of which rotates in an axis concentric with the bearing 140 while engaging a rack gear 173. When the rack 173 is lowered, the carrier train including 172, 171, 170 and 169 causes rotation of the component release driver 168. Lowering of the rack 173 also causes a slight rotational torque upon the member 138 about the points 139 and 140. When the actuator 136 encounters little resistance, the rotational effect is relatively slight. However, when the driver 168 has been rotated to the stop of the actuator 136, a sudden increase in the rotational torque exerted on the member 138 is observed, and the member 138 pivots outwardly, thus swinging the component carrier clear of the component as indicated above, the component is kept from falling by the stabilizer plates 151 while the carrier is being rotated away. In certain cases it may be desirable to provide additional locking of the receiving member 138 in erect position until the carrier is opened.

Synchronism of the component releasing actuator 161 and rotation away of the carrier receiving member 138 with respect to the other portions of the placement apparatus is accomplished through the cam 121 mounted upon the camming cylinder 103. The cam 121 controls the vertical position of the rack 173 with respect to the operating column 102 through the cam follower 124 and the operating rod 125. A raised portion is provided upon the cam 121, spaced to cause a depression of the rack 173 and subsequent opening of the component carrier immediately after the stabilizer plates have seized the component. The carrier receiving member 138 is then kept in its offset position until it has been lifted clear of the placed component.

The mechanisms for locking the receiving member 138 in offset position are shown in Figure 2. They comprise an inwardly biased detent 174, a locking flange 175 upon the actuating rod 125, detent return pins 177 mounted upon the detent 174, and the detent compressor 176 mounted upon the placement head frame 101 and adapted to engage the detent return pins 177.

Locking of the receiving member 138 in the offset position occurs in the following manner. The detent 174 has a sloping surface so that when the actuating rod 125 is depressed, the flange 175 compresses the detent until the flange has slipped beneath it. Thereupon, the detent 174 engages the upper surface of the flange 175, holding the actuating rod 125 down. When the actuating rod 125 is in its lowest position, the receiving member 138 is held in its offset position.

Unlocking of the detent occurs upon the upward stroke of the operating column 102 when the detent compressor 176 mounted upon the placement frame 101 encounters the detent return pins 177. The detent compressor 176 is provided with a surface which moves the return pins 177 outwardly, thus permitting the actuating rod 125 to snap back to its highest position upon the operating column 102. When this occurs, the receiving member 138 is allowed to drop into its normal position.

Figure 6:
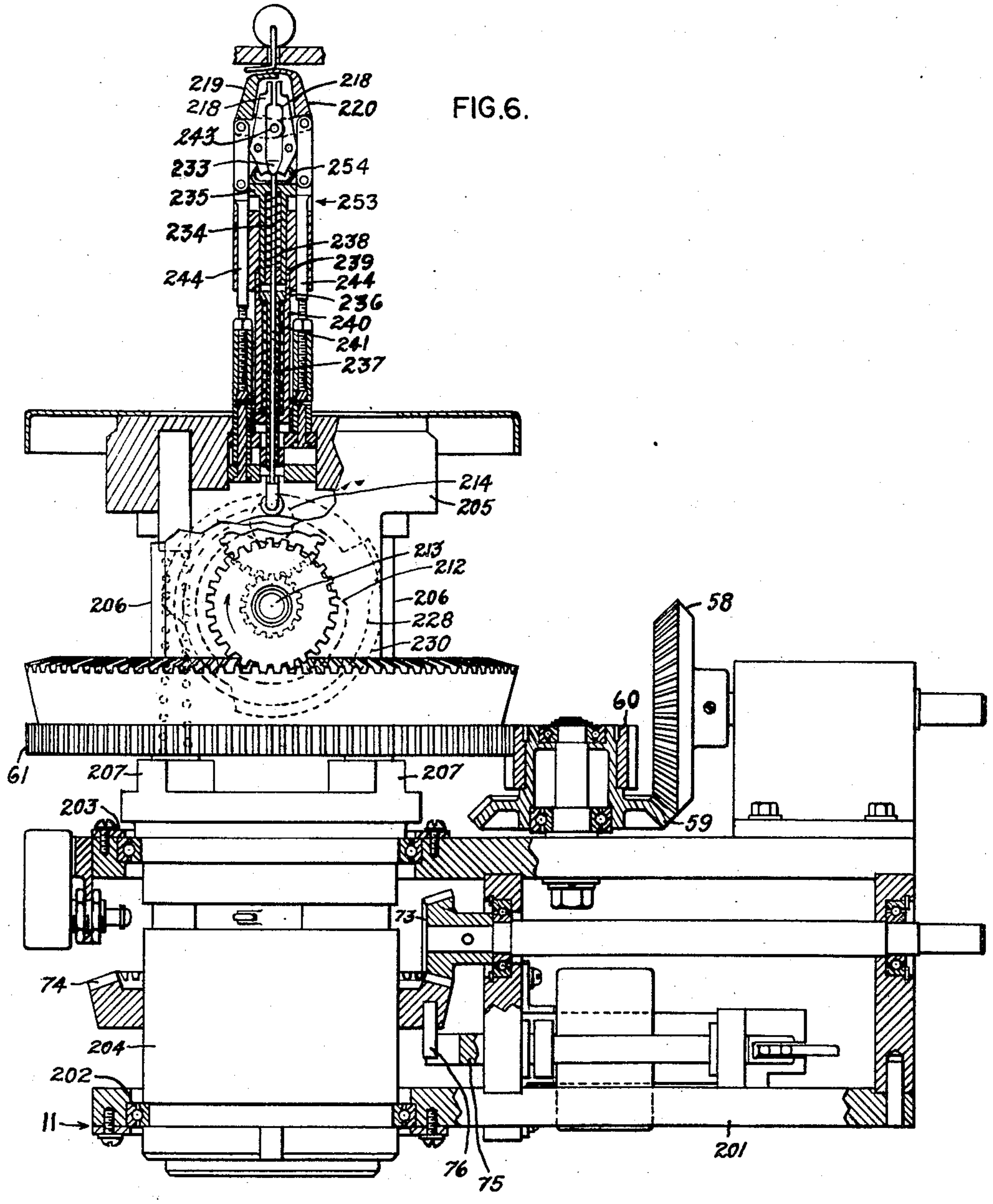
Figure 6 is an elevation view of the lead anchoring mechanism.
Figure 7:
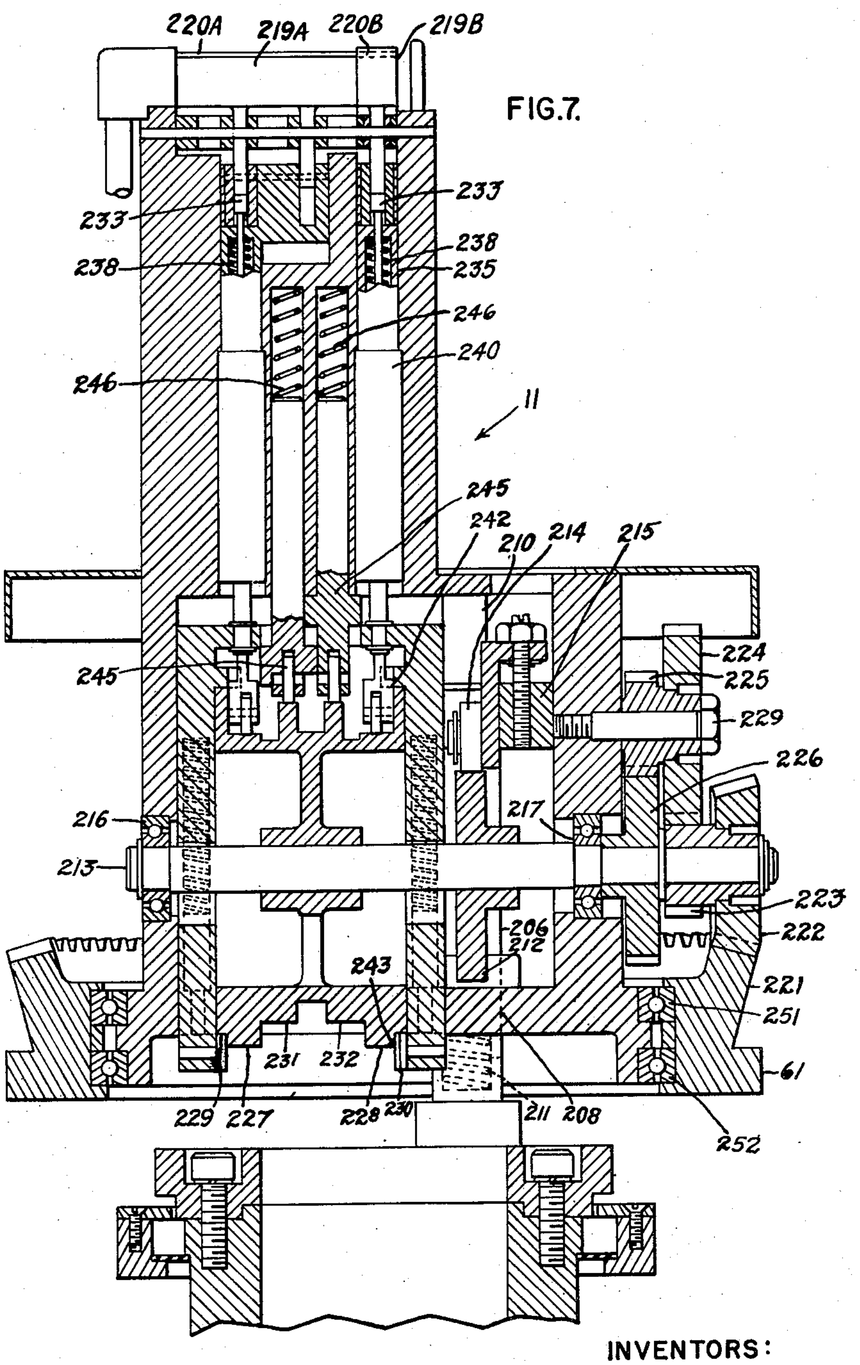
Figure 7 is an elevation view of the upper portion of the lead anchoring mechanism taken at right angles to the view of Figure 6.

The lead anchoring mechanism 11 may best be understood by consideration of Figures 6 and 7. The lead anchoring mechanism 11 mounted upon a frame 201 which is secured to the C frame 12. Bearings 202 and 203 permit rotation of the lead anchoring mechanism 11 as a unit within the frame 201. As indicated in the discussion of the lead anchoring mechanism made in connection with Figure 1, rotation of the lead anchoring mechanism is achieved through a bevel gear 73 which is meshed with a ring gear 74 attached to the periphery of the lead anchoring mechanism mount 204. Precise positioning of the lead anchoring mechanism in azimuth at each of a plurality of selected bearings is achieved by means of the solenoid operated Y member which engages pins 76 extending below the ring gear 74. The lead anchoring mount 204 serves as the support for the lead anchoring housing 205 which houses the timing cams for operating the lead anchoring mechanism.

The housing 205 is adjustably positioned upon the mount 204 upon a pair of hollow cylindrical posts 206 which are affixed in a vertical position to the mount 204 in a pair of bosses 207. Vertical motion of the housing 205 with respect to the mount 204 is accomplished by means of two sets of bearing surfaces. The first sets are provided by cylindrical bearings 208 into which the posts 206 are journalled. The bearings 208 are affixed to the bottom portion of the housing 205. The second set of bearing surfaces are provided by cylindrical pins 210 affixed to the upper portion of the housing 205 adapted to engage and slide freely within the inner cylindrical surfaces of the posts 206. A helical biasing spring 211 is provided within the cylindrical posts 206 for exerting a force between the lower end of the posts 206 and the innermost tip of the pin 210, in a direction to urging the lead anchoring housing 205 to its highest position upon the posts 206. The reference position which the housing 205 takes is set by an adjustable stop.

The stop is provided by roller 214, which engages a cam 212. The cam 212 is supported upon the shaft 213 and the latter is mounted in bearings 216 and 217 secured to the lateral walls of the housing 205. The adjustable roller 214 is positioned upon a bridging element 215 which is secured between the posts 206 secured to the mount 204. By this construction, the reference position of the housing 205 relative to the mount 204 is controlled by the amount of extension of the member 214. This arrangement permits precise adjustment of the distance of the lead anchoring mechanism from the under surface of the circuit board into which components are being placed.

The lead anchoring mechanism 11 performs three principal functions in temporarily fastening the leads of the component in place. It pulls the components down to their final positions; it bends the leads at the point of exit from the under surface of the circuit board, thus holding the components in place; and it clips the leads at an appropriate length. These functions are performed by the lead pull down jaws 218 and the lead clipping jaws 219 and 220.

The operation of the mechanism 11 as a whole, and of the individual units 218, 219 and 220 are achieved in timed synchronism with the operation of the component placement head. The timing is effected by a plurality of cams mounted on the shaft 213 and driven through a gear train involving the gears 58, 59, 60, 61, ring gear 221, and reduction gears 222, 223, 224, 225, and 226. Force for operating the lead anchoring mechanism is initiated through the bevel gear 58 which drives the bevel gear 59 and pinion gear 60. The pinion gear 60 is in turn meshed with the ring gear 61. The ring gear 61 is secured to a second ring gear 221 and the two are mounted upon bearings 251 and 252 which permit rotation of these gears about the housing 205.

The bevel ring gear 221 drives the cam members through a gear reduction unit fastened to one wall of the housing 205. The gear reduction unit includes the gears 222, 223, 224, 225 and 226. Gears 222 and 223 are joined together and journalled for free rotation upon the shaft 213. Likewise, the gears 224 and 225 are joined together and mounted for free rotation upon the shaft 229. The gear 226 is keyed to the shaft 213. The first gear in the gear reduction unit is the ring gear 221 which meshes with the bevel gear 222 and causes rotation of the gears 222 and 223. Gear 223 meshes with gear 224 causing rotation of gear 225. Gear 225 meshes with 226 thus causing rotation of the shaft 213.

The cams for operating the lead anchoring mechanism bear the reference numerals 212, 227, 228, 229, 230, 231, and 232. Cam 212 controls the raising and lowering of the lead anchoring mechanism 11. Cams 227, 228, 229 and 230 control the operation of the pull down jaws 218. Cams 231 and 232 control the operation of the lead clipping jaws 219.

Raising of the lead anchoring mechanism 11 is effected just after the circuit board has been placed in position under the placement head and lowering is effected just before the circuit board is moved on. The cam 212, which rotates in a clockwise direction as seen in Figure 6, effects this raising and lowering and is provided with a single low region for that purpose. The clockwise edge of the low region provides for raising and the counterclockwise edge provides for lowering of the lead anchoring mechanism 11. The low region is sufficiently wide to permit completion of the pull down clipping and bending operations while the mechanism is in its highest position.

Elevation or depression of the lead anchoring mechanism is effected by the same parts mentioned in connection with the adjustment of the reference position of the lead anchoring mechanism with respect to the circuit board. In this case, however, the adjustable roller 214 may be treated as a fixed element, and the cam 212, which has a variable diameter, is treated as the variable element. Analogously, the change in the diameter of the cam 208 at the point where it makes contact with the roller 214 permits the housing 205 to be moved with respect to the mount 204 upon the post 206. The upward bias of the springs 211 urges the housing 205 to the highest position permitted by the cam 212.

The lead pull down jaws 218 are controlled by the cams 227, 228, 229, and 230. The cams 227 and 228 are primarily responsible for jaw opening and closure while the cams 229 and 230 primarily elevate and depress the jaws as a unit. Both groups of cams however, contribute to both operations.

The jaws 218 which are mounted upon a projection 253 extending upwardly from the housing 205 are shown in side elevation in Figure 6. They extend for substantially the width of the clipping jaws. The jaws 218 are pivoted at an intermediate point, and are provided with a U-shaped compression spring 254 which engages their lower ends and tends to urge the jaws into open position. The amount of opening under the bias of the spring 254 is controlled by a wedge-shaped member 233 positioned between the lower ends of the jaws 218. The wedge 233 is adapted to move toward or away from the jaw pivot and is arranged to increase the amount of separation of the jaws by spring 154 when the wedge 233 is elevated toward the pivot and to permit closure of the jaws when the wedge is lowered away from the pivot.

The position of the wedge 233 and hence the open or closed condition of the jaws 218 are controlled principally by the mechanical linkage to the cams 227 and 228. The wedge 233 is provided with a long cylindrical extension rod 234 which extends down through a first cylindrical member 235 slidably arranged on the projection 253 and partly into a second cylindrical member 236 also slidably arranged upon the projection 253. A cylindrical push rod 237 of the same diameter as the wedge extension 234 extends up into the second member 236. Its lower extremity is provided with a roller adapted to engage the cam 228 while its upper end extends into close proximity with the lower extremity of the extension 234. When the roller on 237 encounters the elevations on the cam 228 the upper end of the push rod 237 engages the lower extremity of the extension 234 and drives the wedge up.

The movement of the element 233 is communicated to the elements 235, 238 and 239 which tend to move the jaws upward simultaneously thus preventing opening of the jaws. The upper surface of the cylindrical member 235 serves as a support for the lower surface of the spring 254 and the jaws 218. The position of the cylindrical member and the projection 253 determines the vertical position of the jaws as a whole. A spring 238 contained within the member 235 and encircling the rod 234 is compressed between the upper portion of the cylindrical member 235 and a spring retaining enlargement 239 upon the extension rod 234. Upon elevation of the rod 234 the spring 239 tends to elevate the member 235 at the same time, thus permitting translation of the wedge 233 with respect to the jaws 218.

Opening of the jaws 218 occurs through joint action of the cam 230 and the cam 228. The second cylindrical member 236 is adapted to slide in a third cylindrical member 240. The cylindrical member 236 has an upper flanged portion adapted to slide within the member 240, and a narrower cylindrical portion adapted to slide in an opening at the bottom of member 240. Spring 241 which encircles the second cylindrical member 236 is kept in compression between the flange on 236 and the bottom of 240, thus tending to urge the member 236 to its highest position with respect to the member 240. Member 240 is threaded to the first cylindrical member 235. By virtue of these connections, the units 233, 234, 235, 236, 238, 239, 240 and 241 move upward as a whole preventing translation of the wedge member 233 with respect to the jaws 218.

The follower for the cam 228 retards the travel of the cylindrical members 235, 236 and 240 so as to provide opening of the jaws 218. The follower bears reference numeral 242. Its upper end is secured to the lower end of the push rod 237 while its lower end is provided with a roller 243 adapted to make contact with the cam surface 230. A pair of helical springs in cylindrical recesses within the follower 242 tends to urge the follower upwardly against the lower surface of the cam 230. The springs act between the inner end of the orifices provided in the member 242 and a pin fitted into the lower portion of the housing 205.

Accordingly, when the cam 228 reaches a high point elevating the wedge 233 and the cylindrical members 235, 236 and 240, the follower 242 strikes the surface of the cam 230 at some time before full elevation has been effected.

The follower 242 on striking the surface of cam 230 halts the upward motion of 236, and causes compression of spring 241. This retards the upward motion of cylinder 240. After the spring 241 has been compressed a given amount, however, the upper flange of 236 engages a lip on the upper edge of the member 240 which halts any further upward motion on the part of 240 or 235. The wedge 233 then continues to move upward relative to the jaws 218 under the influence of cam 228, and the jaws are permitted to open under the influence of biasing spring 254.

Further elevation of the jaws 218 continues until the follower 242 enters the lowest portion of the cam 230 at which point further upward motion of the jaws 218 is prevented.

Shortly after the jaws 218 have reached elevated position, they are closed and depressed. Closure occurs when the cam 229 is suddenly reduced in diameter, permitting the push rod 237 to fall. The wedge 233 likewise falls under the influence of the biasing spring 238, thus closing the jaws 218. Lowering of the jaws 218, occurs as the follower 242 reaches the rising portion on the cam 229. At this point the jaw elements 218, 235, 236 and 240 are pulled down as a whole with the jaws in closed position.

The timing of these last three operations are synchronised with the operation of the head so that component leads thrust down by the placement head beneath the circuit board are waiting to be seized as the jaws 218 are elevated, closed and depressed.

During the greater part of the period of operation of the lead anchoring mechanism, the lead clipping jaws 219 and 220 are open. Just after the pull down jaws 218 have drawn a component down, the clipping jaws 219 and 220 come into play. They rapidly close to clip the leads, the jaws bending the leads over against the under surfaces of the circuit board, and then the jaws are reopened. Each of the jaws 219 and 220 are formed in two respective cutting units 219A, 219B, and 220A, 220B, Figure 7, so as to permit one lead at one end of the component to be bent in a direction opposite to the direction in which the other leads are bent. In order to facilitate the bending operation, the upper jaws are provided with a thick blunt end portion which overlaps the lower jaw after the cut and so pushes the portion of the lead remaining beneath the circuit board to one side. The linkage for operating the two portions of the clipping jaws are identical in operation, and both are controlled by the cams 231 and 232.

The clipping jaws 219 and 220 are mounted upon a central pivot 243 and are adapted to be rotated to and from closed position by adjustable connecting linkages 244 coupled to cam followers 245. The cam followers 245 are each provided with a roller for engagement (the roller being best seen in Figure 7) with the cam surfaces and a long cylindrical guide adapted to slide in a cylindrical recess bored vertically into the lead anchoring mechanism projection 253. Compression springs 246 located in these recesses insure that the followers 245 are kept in contact with the cam surfaces 231 and 232. The cam surfaces 231 and 232, which are used to open and close the jaws 219 and 220, are circular except for a single tapered projection, which is of only a few degrees width. In the showing of Figure 6, the projection is directly above the cam shaft 213, as would be expected from the fact that the jaws are illustrated in the closed position. Shortly after the cutting jaws 219 and 220 have opened, the lead anchoring mechanism is lowered as a whole, so that the next circuit board may be brought into place.

Figures 8*a* and through 8*f* and Figure 9 illustrate the sequence in which operations are performed upon the component. In order that the sequence may be more readily understood, only those portions of the apparatus which are handling the component at the time are illustrated. Figure 9 is a cam diagram wherein the various cams are laid out along an abscissa corresponding to the angular rotation of the camming cylinder 103. In this diagram the stabilizer cam 122, the component holder cam 121, the cam 120, the cams 228, 230, 212 and 231 are illustrated. Figure 9 additionally bears legends indicating the timing of the functions as each change in cam occurs.

Referring now to Figure 8*a*, there is shown a portion of the component receiving member 138 of the component placement head 10 just after it has seized a component carrier and removed it from the magazine. Figure 8*a* corresponds to an angle of approximately 280 degrees of rotation of the camming cylinder 103.

Figure 8*b* shows a side elevation view of the component receiving member 138, just as the stabilizer has started down and begun to close about the surface of the component in the alternative construction wherein an outward bias is employed. The drawing corresponds to approximately 295 degrees of rotation of the camming cylinder 103.

Figure 8*c* shows the stabilizer immediately after closure upon the surfaces of the component and corresponds to a position approximately 320 degrees of rotation of the camming cylinder 103.

Figure 8*d* illustrates the position of the component carrier receiving member 138 after it has been swung clear of the component with the stabilizer vanes 151 holding the component in place. The component receiving member 138 remains in the offset position until approximately 20° at the start of the camming cylinder 103.

Figure 8*e* corresponds to the range of from 20° to 40°. The stabilizer thrusts the component down approximately one quarter of an inch at approximately 20° and then snaps open at approximately 40°. Figure 8*e* shows the stabilizer at approximately 20° in solid outline just prior to springing open after it has been thrust down in close proximity to the board and in dotted outline just after it is opened. The lead anchoring mechanism 11 comes instant that the jaws are snapping shut. The clipping jaws 219 are retained open position.

Figure 8*f* corresponds to the point at which the leads have been cut off, at which point, the high point of the cutter cam is in contact with the cutter rollers. This corresponds to approximately 115° rotation of the camming cylinder 103. In a transition from Figure 8*e* to 8*f*, the pull down jaws 218 have been lowered the distance desired to snug the component down against the board.

The camming diagram in Figure 9 shows the orientation of the camming surfaces with respect to the orientation of the camming cylinder 103, and generally indicates step by step the sequence of operations. The principal activity on the part of the lead anchoring mechanism occurs within the region of from 40° to 140° rotation of the camming cylinder 103. The transfer of the component carrier from the magazine to the placement head receiving member 138 of the placement head occurs in the region of from 223° to approximately 275°. Commencing at about 290° to about 40° the component receiving member 138 lowers the component into place, is swung away and the component is thrust down by the stabilizing plates for snugging down by the lead anchoring mechanism.

Certain details of the inventive embodiment and certain refinements have not been disclosed in detail in the specification for purposes of clarity and simplicity and since these details are not essential to an understanding of the present invention. This is true in several situations wherein analogous techniques are employed, as for example in connection with the magazine advancing mechanism. This is constructed in accordance with the technique illustrated in connection with the pallet conveyer 13. Accurate location of the magazine is obtained by solenoid operated pins adapted to engage periodically placed apertures in the magazine. Advancing of the magazine may be achieved by a slipping clutch drive of the nature employed in connection with the pallet conveyer or a more conventional ratchet and pawl mechanism. The timing of the advancing mechanism is obtained by means of a camming cylinder located on the under surface of the camming cylinder 103.

Likewise, no detailed description has been made of the manner in which the jaws 118 of the lead anchoring mechanism are cleared. This may be achieved by an air blast, the nozzle of which is shown in the drawing, timed by an appropriate cam.

The present embodiment of the invention has been conceived with several strict requirements in mind. High accuracy in lead placement and secure vibration-free mounting of the components has been essential. In achieving highly accurate placement, it has been necessary to support the flexible component leads in the component carrier near their tips so that the tips of the leads will not depart far from the expected position indicated by the position of the carrier. Such leads are subject to random bending and misalignment. The accuracy requirement makes it essential that additional means be provided above the circuit matrix for thrusting the component down further into the circuit matrix. The component stabilizer consequently performs its function in addition to supporting the component at the time that the component is being released from the component carrier. In an application where accuracy is not so essential, the thrusting down motion may not be required above the circuit board, and the component may be supported in the component holder with adequate extension beneath to permit the leads to penetrate the circuit board. In such a case the stabilizing action may be effected by the inner jaws 118 of the lead anchoring mechanism.

The snugging down operation performed by the lead anchoring mechanism is dictated by the requirement that the bodies of the components be secured against the upper surface of the circuit board in order to reduce the harmful effects of vibration upon the completed assembly. The principal reason for employing the lead anchoring mechanism located beneath the board to do this is that the leads of many multi-leaded components tend to snub in the circuit orifices when driven from above due to lead deformation, but slide freely through the orifices when a pulling action from beneath is employed. In addition, the use of the inner holding jaws during the clipping action tends to offset the natural tendency of the leads to move upwardly as they are bent to one side. The opposite bending of the clipped component leads prevents the tendency of the component to move to either side.

If one does not require the components be snubbed down firmly to the upper surface of the circuit board, a single lowering action after lead insertion is all that is required. This pull down action may then be accomplished by either the stabilizer of the lead anchoring mechanism alone, each method having its own peculiar advantages as indicated above.

While a particular embodiment of the invention has been shown and described, it will of course be apparent that various modifications may be made thereto without departing from the invention. Therefore by the appended claims it is intended to cover all such changes and modifications as fall within the true spirit and scope of the invention.

What I claim as new and desire to secure by Letters Patent of the United States is:

1. In combination, a component placement head having a receiving member adapted to receive a component carrier, means for supplying a plurality of perforated circuit matrices in preassigned position with relation to said placement head, means for supplying components mounted in lead supporting component carriers to said placement head, said placement head including means for translating said carrier receiving member toward said circuit matrix so that the leads of the component supported therein enter the desired perforations, means for separating said component carrier from said component and translating said component carrier away from said component and said matrix, stabilizing means adapted to hold said component in place during said separation, means for thrusting said stabilizer means toward said circuit matrix, lead gripping jaws adapted to seize said leads upon passage through said circuit matrix, two pairs of lead clipping members for severing said leads, one pair being adapted to bend the ends of said leads in an opposite direction to the other, and timing means for retaining said gripping jaws in closed position during said clipping operation.

2. In combination, a component placement head having a receiving member adapted to receive a component carrier, means for supplying a plurality of perforated circuit matrices in preassigned position with relation to said placement head, means for supplying components mounted in lead supporting component carriers to said placement head, said placement head including means for translating said carrier receiving member toward said circuit matrix so that the leads of the component supported therein enter the desired perforations, means for separating said component carrier from said component and translating said component carrier away from said component and said matrix, stabilizing means adapted to hold said component in place during said separation, and lead clinching means adapted to bend the ends of the leads which pass through the matrix aside to secure the component in place.

3. In combination, a component placement head having a receiving member adapted to receive a component carrier, means for supplying a plurality of perforated circuit matrices in preassigned position with relation to said placement head, means for supplying components mounted in lead supporting component carriers to said placement head, said placement head including means for translating said carrier receiving member toward said circuit matrix so that the leads of the component supported therein enter the desired perforations, means for separating said component carrier from said component and translating said component carrier from said component and said matrix, and stabilizing means adapted to hold said component in place during said separation.

4. In combination, a component placement head having a receiving member adapted to receive a component carrier, means for supplying a plurality of perforated circuit matrices in preassigned position with relation to said placement head, means for supplying components mounted in lead supporting component carriers to said placement head, said placement head including means for translating said carrier receiving member toward said circuit matrix so that the leads of the component supported therein enter the desired perforations, means for separating said component carrier from said component and translating said component carrier from said component and said matrix, and stabilizing means positioned beneath said matrix adapted to hold said component in place during said separation and to pull down the component after said separation.

5. In combination, a component placement head, means for supplying a plurality of perforated circuit matrices in preassigned position with relation to said placement head, means for supplying components to said placement head, said placement head including means for translating said components toward said circuit matrix so that the leads of the component enter the desired perforations, lead gripping jaws on the reverse side of said circuit matrix adapted to seize said leads upon passing through said circuit matrix and to pull said leads along.

6. In combination, a component placement head, means for supplying a plurality of perforated circuit matrices in preassigned position with relation to said placement head, said placement head including means for translating said components toward said circuit matrix so that the leads of the component enter the desired perforations, lead gripping jaws on the reverse side of said circuit matrix adapted to seize said leads upon passing through said circuit matrix and to pull said leads along, and clipping means adapted to sever the portions of the leads extending through said matrix while bending the ends aside.

7. In combination, a component placement head having a receiving member adapted to receive a component carrier, means for supplying a plurality of perforated circuit matrices in preassigned position with relation to said placement head, means for supplying components mounted in lead supporting component carriers to said placement head, said placement head including means for translating said carrier receiving member toward said circuit matrix so that the leads of the component supported therein enter the desired perforations, means for separating said component carrier from said component and translating said component carrier away from said component and said matrix, stabilizing means adapted to hold said component in place during said separation, means for thrusting said stabilizing means toward said circuit matrix, lead gripping jaws adapted to seize said leads upon passing through said circuit matrix, and to pull said component against the surface of the circuit matrix, and a pair of lead clipping members for severing said leads, one pair being adapted to bend the ends of said leads in an opposite direction to the other, and timing means for retaining said gripping jaws in closed position during said clipping operation.

8. In combination, a component placement head, means for supplying a plurality of perforated circuit matrices in preassigned position with relation to said placement head, said placement head including means for translating said components toward said circuit matrix so that the leads of the component enter the desired perforations, lead gripping jaws on the reverse side of said circuit matrix adapted to seize said leads upon passing through said circuit matrix and to pull said leads along, and two pairs of lead clipping members for severing said leads, one pair being adapted to bend the ends of the leads in an opposite direction to the other pair.

9. In combination, a component placement head, means for supplying a plurality of perforated circuit matrices in preassigned position with relation to said placement head, said placement head including means for translating said components toward said circuit matrix so that the leads of the component enter the desired perforations, lead gripping jaws on the reverse side of said circuit matrix adapted to seize said leads upon passing through said circuit matrix and to pull said leads along, two pairs of lead clipping members for severing said leads, one pair being adapted to bend the ends of said leads in an opposite direction to the other pair, and timing means for retaining said gripping jaws in closed position during said clipping operation.

10. In combination, a component placement head, means for supplying a plurality of circuit matrices in preassigned position with respect to said placement head, and means for supplying components mounted in lead supporting carriers to said placement head, said placement head comprising a component carrier receiving member, means for translating said receiving member sequentially from a retracted position to a position adjacent said matrix in which the leads of the component supported in said component carrier extend into orifices prepared in said matrix and for retracting said carrier receiving member after placement of said component in said matrix through a second path clear of said component to said retracted position, and means for releasing said component from said carrier prior to retraction of said receiving member.

11. In combination, a reciprocally displaceable placement head movable along a predetermined path, means for supporting a circuit matrix in predetermined position adjacent one end of said path, means to supply a loaded component carrier to said placement head prior to each placement operation, said component carriers each having a rotating component release actuator, said placement head having supported thereon a rack gear arranged for translation and a pivotally mounted component carrier receiving member having a pinion gear meshed with said rack gear and coaxially aligned with said pivots, said pinion gear being mechanically linked to the rotating component release actuator when a component carrier is in position in said receiving member, said rack being adapted, upon translation thereof relative to said pinion to cause said pinion to rotate to an angle greater than that required to operate said component carrier release actuator thus forcing said receiving member to rotate away from said path a distance sufficient to permit retraction of said receiving member clear of said placed component.

12. In combination, a component placement head having a receiving member adapted to receive a component carrier, means for supplying a plurality of perforated circuit boards in preassigned position with relation to said placement head, means for supplying components mounted in lead supporting component carriers to said placement head, said placement head including means for translating said carrier receiving member toward said circuit matrix so that the leads of the component supported therein enter the desired perforations, means for separating said component carrier from said component and translating said component carrier from said component and said matrix, and stabilizing means comprising a pair of plane surfaced members constrained to move in parallel planes adapted to hold said component in place during said separation.

13. In combination, a component placement head adapted to place leaded electrical components into prepared circuit matrices in any of a plurality of azimuthal positions, said placement head having a mechanical drive input for effecting said placement operation and a mechanical drive input for effecting azimuthal positioning of said placement head, a component lead handling mechanism positioned adjacent the reverse side of said matrices during the placement operation adapted to facilitate component placement and positionable in azimuthal positions corresponding to those of said placement head, said lead handling mechanism also having a mechanical drive input for effecting operation thereof and a mechanical drive input for effecting azimuthal positioning thereof, a first mechanical linkage between said operating inputs for synchronizing operation between said placement head and said lead handling mechanism, and a second mechanical linkage between said rotational inputs for synchronizing azimuthal positioning of said placement head and said lead handling mechanism.

14. In combination, a component placement head adapted to place leaded electrical components into prepared circuit matrices in any of a plurality of azimuthal positions, said placement head having a mechanical drive input for effecting said placement operation and a mechanical drive input for effecting azimuthal positioning of said placement head, a component lead handling mechanism positioned adjacent the reverse side of said matrices during the placement operation adapted to facilitate component placement and positionable in azimuthal positions corresponding to those of said placement head, said lead handling mechanism also having a mechanical drive input for effecting operation thereof and a mechanical drive input for effecting azimuthal positioning thereof, a first mechanical linkage between said operating inputs for synchronizing operation between said placement head and said lead handling mechanism, a second mechanical linkage between said rotational inputs for synchronizing azimuthal positioning of said placement head and said lead handling mechanism, the driven members of said operating inputs tending to rotate said driving members upon rotation of their respective units in azimuth, a source of power, a pair of mechanical drives, each adapted to be coupled respectively between one of said linkages and said source and adapted to rotate said placement head and said lead handling mechanism without causing actual motion between said driving and said driven members of said operation inputs, a second mechanical drive adapted to be connected between said operating linkage and said source, a brake adapted to be coupled to said azimuthal linkage, and a two gang clutch adapted in one position to couple both of said first recited mechanical drives to said source when rotation is desired and in a second position to connect said second mechanical drive to said source and said azimuthal linkage to said brake when operation is desired.

15. In combination, a component placement head adapted to place leaded components into prepared circuit matrices in any of a plurality of azimuthal positions, said placement head having a mechanical drive input for effecting azimuthal positioning of said placement head, a component lead handling mechanism positioned adjacent the reverse side of said matrices during the placement operation adapted to facilitate component placement and positionable in azimuthal positions corresponding to those of said placement head, said lead handling mechanism also having a mechanical drive input for effecting operation thereof and a mechanical drive input for effecting azimuthal positioning thereof, a first mechanical linkage between said operating inputs for synchronizing operation between said placement head and said lead handling mechanism, a second mechanical linkage between said rotational inputs for synchronizing azimuthal positioning of said placement head and said lead handling mechanism, the driven members of said operating inputs tending to rotate said driving members upon rotation of their respective units in azimuth, means for jointly rotating said linkages through a ratio proportioned to prevent rotation of said driven members with respect to said driving members of said operating inputs when rotation of said units is desired, and means for simultaneously rotating said operating linkage and braking said azimuthal linkage when operation is desired.

No references cited.